UNITED STATES PATENT OFFICE.

EMIL WALDER, OF BASEL, SWITZERLAND, ASSIGNOR TO CHEMICAL WORKS FORMERLY SANDOZ, OF BASEL, SWITZERLAND.

MANUFACTURE OF BLUE TO GREENISH-BLUE COLORING-MATTERS OF THE GALLO-CYANIN SERIES.

1,299,070. Specification of Letters Patent. Patented Apr. 1, 1919.

No Drawing. Application filed December 13, 1916. Serial No. 136,742.

*To all whom it may concern:*

Be it known that I, Dr. EMIL WALDER, a citizen of the Republic of Switzerland, residing in Basel, Canton of Basel, Switzerland, have invented certain new and useful Improvements in the Manufacture of Blue to Greenish-Blue Coloring-Matters of the Gallocyanin Series, of which the following is a specification.

It has been found that by the condensation of gallocyanins with m- and p-aminobenzamid, and by reducing the insoluble condensation products so obtained, new coloring matters are obtained which dye on chrome mordants blue and greenish blue shades of considerable fastness to light, soap and chlorin.

The new condensation products and their respective leuco products correspond to the following structural formulæ, in which R stands for methyl ($CH_3$) or ethyl ($C_2H_5$):

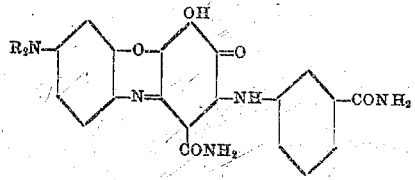

(Structural formula of the condensation product of a gallocyanin dye with m-aminobenzamid).

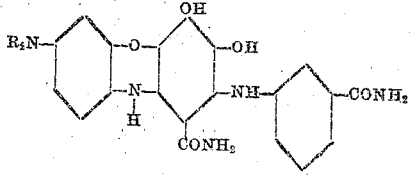

(Structural formula of the leuco compound of the condensation product of a gallocyanin dye with m-aminobenzamid).

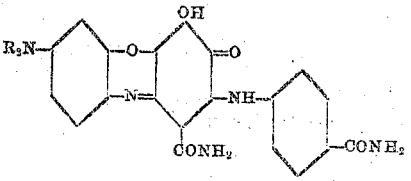

(Structural formula of the condensation product of a gallocyanin dye with p-aminobenzamid).

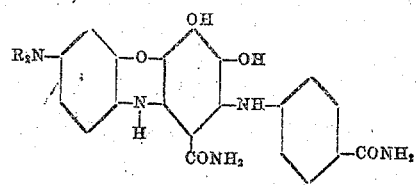

(Structural formula of the leuco compound of the condensation product of a gallocyanin dye with p-aminobenzamid.)

The specifications of German Patents 166,679, 178,841 and 182,783 describe condensation products from gallocyanins with aminobenzoic acids which in the form of their soluble alkali salts can be used directly for dyeing and printing. These colors have, however, the disadvantage of being fixed only after prolonged steaming. The leuco compounds which can be made from them in the well known ways, for instance with zinc and hydrochloric acid, can be fixed more easily, but the shades in printing are less fast to soap, and in particular of less fastness to chlorin, than the leuco compounds of the condensation products from gallocyanins and aminobenzamids.

Example: 180 kg. metaminobenzamid, and 60 kg. coelestin blue are heated with or without an oxidizing agent, for example air or aromatic nitro compounds, during 4–5 hours to 110° C. From the melt extracted with hot water the condensation product is obtained by filtering and washing. The condensation can also be performed in alcoholic solution. The product is a very crystalline body, insoluble in water, alcohol, dilute acids and alkalis, but soluble with a red-violet color in concentrated sulfuric acid, and with a red color in concentrated hydrochloric acid; in both cases the solution turns to brown on diluting with water.

The conversion into the leuco compound can be effected as follows:—50 kg. of the above condensation product are suspended with stirring in 1000 liters of water and 50 kg. of hydrochloric acid; the temperature is raised to 75–80° C. and 25 kg. zinc dust in small portions are added at this temperature.

As soon as the reduction is completed, the solution so obtained is filtered and the leuco compound precipitated by addition of common salt. A thick oily mass is obtained which has a tendency to grow stiff at once. The reduction can also be effected with sodium hydrosulfite in presence of alkalis, and the leuco compound be precipitated by slightly acidulating afterward. The leuco compound is easily soluble in water; printed with chrome mordants, i. e. acetate or formate of chromium, it produces on very short steaming green blue shades of remarkable purity and of excellent fastness to light, soap and chlorin.

In a similar way the condensation products of gallocyanin and prune with m-aminobenzamid and of coelestin blue with p-aminobenzamid and the corresponding leuco derivatives can be made.

The leuco compound from the condensation product of gallocyanin and m-aminobenzamid gives in printing clear shades of a more reddish blue than those mentioned in the example. The leuco compound of the condensation product of prune and m-aminobenzamid is difficultly soluble and gives more reddish blue shades in printing than the leuco compound of the condensation product of coelestin blue with m-aminobenzamid. The product obtained from coelestin blue and p-aminobenzamid is very little different from that obtained with the m-aminobenzamid.

What I claim and desire to secure by Letters Patent is:—

1. Process for the manufacture of a condensation product of the gallocyanin series, comprising condensing a gallocyanin dye with aminobenzamid other than o-aminobenzamid.

2. Process for the manufacture of a condensation product of the gallocyanin series, comprising condensing a gallocyanin dye with aminobenzamid other than o-aminobenzamid in presence of an oxidizing agent.

3. Process for the manufacture of a leuco condensation product of the gallocyanin series, comprising condensing a gallocyanin dye with aminobenzamid other than o-aminobenzamid and reducing the resulting condensation product.

4. Process for the manufacture of a leuco condensation product of the gallocyanin series, comprising condensing a gallocyanin dye with aminobenzamid other than o-aminobenzamid in presence of an oxidizing agent and reducing the resulting condensation product.

5. Process for the manufacture of a condensation product of the gallocyanin series, comprising condensing a gallocyanin dye with m-aminobenzamid.

6. Process for the manufacture of a condensation product of the gallocyanin series, comprising condensing a gallocyanin dye with m-aminobenzamid in presence of an oxidizing agent.

7. Process for the manufacture of a leuco condensation product of the gallocyanin series, comprising condensing a gallocyanin dye with m-aminobenzamid and reducing the resulting condensation product.

8. Process for the manufacture of a leuco condensation product of the gallocyanin series, comprising condensing a gallocyanin dye with m-aminobenzamid in presence of an oxidizing agent and reducing the resulting condensation product.

9. As a new article of manufacture a condensation product of a gallocyanin dye with m-aminobenzamid, said condensation product corresponding to the structural formula:

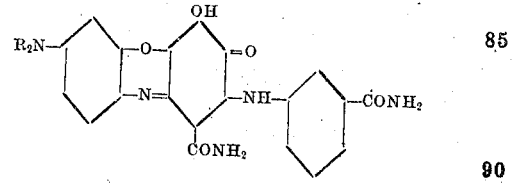

R representing methyl ($CH_3$) or ethyl ($C_2H_5$).

10. As a new article of manufacture a leuco compound of a condensation product of a gallocyanin dye with m-aminobenzamid, said leuco compound corresponding to the structural formula:

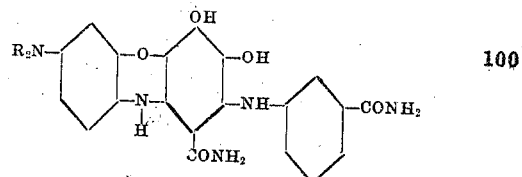

R representing methyl ($CH_3$) or ethyl ($C_2H_5$).

In witness whereof I have hereunto signed my name in the presence of two subscribing witnesses.

Dr. EMIL WALDER

Witnesses:
 WERNER HAUFFACHER,
 GEO. H. WAGNER.